United States Patent
Ihara

(10) Patent No.: US 6,636,902 B2
(45) Date of Patent: Oct. 21, 2003

(54) PRINTING SYSTEM FOR CONTROLLING LIMITING A RECEPTION OF COMMAND PACKETS OTHER THAN A TRANSMIT DATA COMMAND UPON RECEIVING THE TRANSMIT DATA COMMAND FOR RECEIVING PRINTING DATA

(75) Inventor: Yushi Ihara, Kanagawa (JP)

(73) Assignee: Sony Corporation, Tokyo (JP)

( * ) Notice: Subject to any disclaimer, the term of this patent is extended or adjusted under 35 U.S.C. 154(b) by 360 days.

(21) Appl. No.: 09/760,565

(22) Filed: Jan. 16, 2001

(65) Prior Publication Data

US 2001/0025325 A1 Sep. 27, 2001

(30) Foreign Application Priority Data

Jan. 18, 2000 (JP) .................................... 2000-013959

(51) Int. Cl.[7] .................................. G06F 13/14
(52) U.S. Cl. .................... 710/5; 710/8; 710/14; 358/1.15
(58) Field of Search .................. 358/1.1, 1.15; 399/82, 85; 710/5, 8, 14, 105

(56) References Cited

U.S. PATENT DOCUMENTS 5,991,053 A * 11/1999 Matsuo et al. ............ 358/468
6,280,105 B1 * 8/2001 Iida .............................. 400/74
6,298,405 B1 * 10/2001 Ito et al. ..................... 710/107
6,549,947 B1 * 4/2003 Suzuki ......................... 709/229

* cited by examiner

Primary Examiner—Ilwoo Park
(74) Attorney, Agent, or Firm—Frommer Lawrence & Haug LLP; William S. Frommer

(57) ABSTRACT

A printing apparatus provides with an interface conforming to the IEEE 1394 Standards can carry out printing operations on a stable basis. The printing apparatus comprises a printing engine for carrying out a printing operation by using a printing data and a data input section adapted to receive a printing data contained in a packet conforming to the IEEE 1394 Standards and a command packet from an STB. The printing apparatus is moved into an idle status M2 for receiving a command packet when an add printing command is input from the STB and into a reception status M3 for limiting the reception of command packets other than the one containing a data transmission command when a data transmission command for receiving a printing data is input.

14 Claims, 18 Drawing Sheets

| | pixel_x | pixel_y | interlaced/progressive | pixel format | screen aspect ratio | pixel aspect ratio | based standard | image size |
|---|---|---|---|---|---|---|---|---|
| 1080_422_16×9 | 1920 | 1080 | interlaced/progressive | YCbCr 4:2:2 | 16:9 | 1:1 | ITU-R BT. 709-2 | 3.96MB |
| 1080_420_16×9 | 1920 | 1080 | interlaced/progressive | YCbCr 4:2:0 | 16:9 | 1:1 | ITU-R BT. 709-2 | 2.97MB |
| 720_422_16×9 | 1280 | 720 | progressive | YCbCr 4:2:2 | 16:9 | 1:1 | ANSI/SMPTE 296 M-1997 | 1.76MB |
| 720_420_16×9 | 1280 | 720 | progressive | YCbCr 4:2:0 | 16:9 | 1:1 | ANSI/SMPTE 296 M-1997 | 1.32MB |
| 576_422_4×3 | 720 | 576 | interlaced/progressive | YCbCr 4:2:2 | 4:3 | 1.07:1 | ITU-R BT.1203 | 810KB |
| 576_420_4×3 | 720 | 576 | interlaced/progressive | YCbCr 4:2:0 | 4:3 | 1.07:1 | ITU-R BT.1203 | 608KB |
| 480_422_16×9 | 720 | 480 | interlaced/progressive | YCbCr 4:2:2 | 16:9 | 1.19:1 | ITU-R BT. 709-2 | 675KB |
| 480_420_16×9 | 720 | 480 | interlaced/progressive | YCbCr 4:2:0 | 16:9 | 1.19:1 | ITU-R BT. 709-2 | 506KB |
| 480_422_4×3 | 720 | 480 | interlaced/progressive | YCbCr 4:2:2 | 4:3 | 0.89:1 | ITU-R BT.601-4 | 675KB |
| 480_420_4×3 | 720 | 480 | interlaced/progressive | YCbCr 4:2:0 | 4:3 | 0.89:1 | ITU-R BT.601-4 | 506KB |

FIG.7

|  | msb | | | | | | lsb |
|---|---|---|---|---|---|---|---|
| opcode | \multicolumn{7}{c|}{OPERATION MODE($41_{16}$)} |
| operand [0] | \multicolumn{7}{c|}{subfunction} |
| operand [1] | \multicolumn{7}{c|}{status} |
| operand [2] | \multicolumn{7}{c|}{next_pic} |
| operand [3] | \multicolumn{7}{c|}{next_page} |
| operand [4] | | | | | | | |
| operand [5] ... operand [16] | \multicolumn{7}{c|}{print_job_ID} |
| operand [17] ... operand [24] | \multicolumn{7}{c|}{operation_mode_parameters} |
| operand [25] ... operand [29] | \multicolumn{7}{c|}{operation_mode_optional_parameters} |
| operand [30] operand [31] operand [32] | \multicolumn{7}{c|}{reserved} |

FIG.8

| Adress offset | Contents |
|---|---|
| $00_{16}$ | media_type |
| $01_{16}$ | Media_size |
| $02_{16}$ | |
| $03_{16}$ | |
| $04_{16}$ | reserved |
| $05_{16}$ | Print_quality |
| $06_{16}$ | Mono_color |
| $07_{16}$ | offset |
| $08_{16}$ | |
| $09_{16}$ | |
| $0A_{16}$ | |
| $0B_{16}$ | Layout_type |
| $0C_{16}$ | |
| $0D_{16}$ | |
| $0E_{16}$ | |

FIG.9

| | msb | | | | | | lsb |
|---|---|---|---|---|---|---|---|
| opcode | \multicolumn{7}{c}{CAPTURE($42_{16}$)} |
| operand [0] | \multicolumn{7}{c}{subfunction} |
| operand [1] | \multicolumn{5}{c}{source_subunit_type} | \multicolumn{2}{c}{source_subunit_ID} |
| operand [2] | \multicolumn{7}{c}{source_plug} |
| operand [3] | \multicolumn{7}{c}{status} |
| operand [4] | \multicolumn{7}{c}{dest_plug} |
| operand [5] | \multicolumn{7}{c}{} |
| | \multicolumn{7}{c}{print_job_ID} |
| operand [16] | \multicolumn{7}{c}{} |
| operand [17] | \multicolumn{7}{c}{} |
| operand [18] | \multicolumn{7}{c}{data_size} |
| operand [19] | \multicolumn{7}{c}{} |
| operand [20] | \multicolumn{7}{c}{} |
| operand [21] | \multicolumn{7}{c}{} |
| operand [22] | \multicolumn{7}{c}{image_size_x} |
| operand [23] | \multicolumn{7}{c}{} |
| operand [24] | \multicolumn{7}{c}{image_size_y} |
| operand [25] | \multicolumn{7}{c}{image_format_specifier} |
| operand [26] | \multicolumn{7}{c}{} |
| operand [27] | \multicolumn{7}{c}{} |
| operand [28] | \multicolumn{7}{c}{reserved} |
| operand [29] | \multicolumn{7}{c}{} |
| operand [30] | \multicolumn{7}{c}{next_pic} |
| operand [31] | \multicolumn{7}{c}{} |
| operand [32] | \multicolumn{7}{c}{next_page} |

FIG.10

| value | Type | Meaning |
|---|---|---|
| $20_{16}$ | 1080i _ 422plane _ 16×9 | |
| $21_{16}$ | 1080p _ 422plane _ 16×9 | |
| $22_{16}$ | 720p _ 422plane _ 16×9 | |
| $23_{16}$ | 480I _ 422plane _ 16×9 | |
| $24_{16}$ | 480p _ 422plane _ 16×9 | |
| $25_{16}$ | 480I _ 422plane _ 4×3 | |
| $26_{16}$ | 480p _ 422plane _ 4×3 | |
| $28_{16}$ | 1080i _ 422line _ 16×9 | |
| $29_{16}$ | 1080p _ 422line _ 16×9 | |
| $2A_{16}$ | 720p _ 422line _ 16×9 | |
| $2B_{16}$ | 480I _ 422line _ 16×9 | |
| $2C_{16}$ | 480p _ 422line _ 16×9 | |
| $2D_{16}$ | 480I _ 422line _ 4×3 | |
| $2E_{16}$ | 480p _ 422line _ 4×3 | |
| $30_{16}$ | 1080i _ 420plane _ 16×9 | |
| $31_{16}$ | 1080p _ 420plane _ 16×9 | |
| $32_{16}$ | 720p _ 420plane _ 16×9 | |
| $33_{16}$ | 480I _ 420plane _ 16×9 | |
| $34_{16}$ | 480p _ 420plane _ 16×9 | |
| $35_{16}$ | 480I _ 420plane _ 4×3 | |
| $36_{16}$ | 480p _ 420plane _ 4×3 | |
| $38_{16}$ | 1080i _ 420line _ 16×9 | |
| $39_{16}$ | 1080p _ 420line _ 16×9 | |
| $3A_{16}$ | 720p _ 420line _ 16×9 | |
| $3B_{16}$ | 480I _ 420line _ 16×9 | |
| $3C_{16}$ | 480p _ 420line _ 16×9 | |
| $3D_{16}$ | 480I _ 420line _ 4×3 | |
| $3E_{16}$ | 480p _ 420line _ 4×3 | |
| $60_{16}$ | Text(ASCII) | MD-clip ASCII |
| $61_{16}$ | Text(ISO8859-1) | MD-clip modified ISO8859-1 |
| $62_{16}$ | Text(Music Shifted JIS) | MD-clip Music Shifted JIS |

FIG.11

| Value(MSB) | Value(LSB) | Type | Meaning |
|---|---|---|---|
| $00_{16}$ | $00_{16}$ | sRGB raw | sRGB raw |
| | $01_{16}$ | sRGB raw, quadlet | |
| $01_{16}$ | $0X_{16}$ | YCC4:2:2 raw/pixel | YCC raw |
| | $1X_{16}$ | YCC4:2:2 raw/line | |
| | $8X_{16}$ | YCC4:2:0 raw/pixel | |
| | $9X_{16}$ | YCC4:2:0 raw/line | |
| | $X0_{16}$ | Pixel ratio 1.00×1.00 / ITU-R BT.709-2 / interlace | |
| | $X1_{16}$ | Pixel ratio 1.19×1.00 / ITU-R BT.709-2 / interlace | |
| | $X2_{16}$ | Pixel ratio 0.89×1.00 / ITU-R BT.709-2 / interlace | |
| | $X3_{16}$ | Pixel ratio 1.07×1.00 / ITU-R BT.601-4 / interlace | |
| | $X4_{16}$ | Pixel ratio 1.00×1.00 / ITU-R BT.1203 / interlace | |
| | $X8_{16}$ | Pixel ratio 1.00×1.00 / ITU-R BT.709-2 / progressive | |
| | $X9_{16}$ | Pixel ratio 1.19×1.00 / ITU-R BT.709-2 / progressive | |
| | $XA_{16}$ | Pixel ratio 0.89×1.00 / ITU-R BT.709-2 / progressive | |
| | $XB_{16}$ | Pixel ratio 0.89×1.00 / ITU-R BT.601-4 / progressive | |
| | $XC_{16}$ | Pixel ratio 1.07×1.00 / ITU-R BT.1203 / progressive | |
| $10_{16}$ | $00_{16}$ | Exif 2.1 | DCF Object |
| | $01_{16}$ | JFIF | |
| | $02_{16}$ | TIFF | |
| | $0F_{16}$ | JPEG | |
| $80_{16}\sim8F_{16}$ | $00_{16}\sim FF_{16}$ | Vendor Dependent format | |
| $FE_{16}$ | $00_{16}$ | Unit Plug defined | Special meaning |
| | $01_{16}$ | don't care | |

FIG.12

| Address Offset | 1st byte | 2nd byte | 3rd byte | 4th byte |
|---|---|---|---|---|
| 00 00 00 00$_{16}$ | Y0(L0) | Y1(L0) | Cb0(L0) | Cr0(L0) |
| 00 00 00 04$_{16}$ | Y2(L0) | Y3(L0) | Cb2(L0) | Cr2(L0) |
| ⋮ | | ⋮ | | |
| 00 00 05 9C$_{16}$ | Y718(L0) | Y719(L0) | Cb718(L0) | Cr718(L0) |
| 00 00 05 A0$_{16}$ | Y0(L1) | Y1(L1) | Cb0(L1) | Cr0(L1) |
| ⋮ | | ⋮ | | |
| 00 0A 8B FC$_{16}$ | Y718(L479) | Y719(L479) | Cb718(L479) | Cr718(L479) |

FIG.13

| Address Offset | 1st byte | 2nd byte | 3rd byte | 4th byte |
|---|---|---|---|---|
| 00 00 00 00$_{16}$ | Y0(L0) | Y1(L0) | Y0(L1) | Y1(L1) |
| 00 00 00 04$_{16}$ | Cr0(L0) | Cr0(L0) | Y2(L0) | Y3(L0) |
| 00 00 00 08$_{16}$ | Y2(L1) | Y3(L1) | Cb2(L0) | Cr2(L0) |
| ⋮ | | ⋮ | | |
| 00 07 E8 F8$_{16}$ | Cb716(L478) | Cr716(L478) | Y718(L478) | Y719(L478) |
| 00 07 E8 FC$_{16}$ | Y718(L479) | Y719(L479) | Cb718(L478) | Cr718(L478) |

FIG.14

| Address Offset | 1st byte | 2nd byte | 3rd byte | 4th byte |
|---|---|---|---|---|
| 00 00 00 00$_{16}$ | Y0(L0) | Y1(L0) | Y2(L0) | Y3(L0) |
| ⋮ | | ⋮ | | |
| 00 00 02 CF$_{16}$ | Y716(L0) | Y717(L0) | Y718(L0) | Y719(L0) |
| 00 00 02 D0$_{16}$ | Cb0(L0) | Cr0(L0) | Cb2(L0) | Cr2(L0) |
| ⋮ | | ⋮ | | |
| 00 00 05 9F$_{16}$ | Cb716(L0) | Cr716(L0) | Cb718(L0) | Cr718(L0) |
| 00 00 05 A0$_{16}$ | Y0(L1) | Y1(L1) | Y2(L1) | Y3(L1) |
| ⋮ | | ⋮ | | |
| 00 0A 8B FC$_{16}$ | Cb716(L479) | Cr716(L479) | Cb718(L479) | Cr718(L479) |

FIG.15

| Address Offset | 1st byte | 2nd byte | 3rd byte | 4th byte |
|---|---|---|---|---|
| 00 00 00 00$_{16}$ | Y0(L0) | Y1(L0) | Y2(L0) | Y3(L0) |
| ⋮ | | ⋮ | | |
| 00 00 02 CF$_{16}$ | Y716(L0) | Y717(L0) | Y718(L0) | Y719(L0) |
| 00 00 02 D0$_{16}$ | Y0(L1) | Y1(L1) | Y2(L1) | Y3(L1) |
| ⋮ | | ⋮ | | |
| 00 00 05 9F$_{16}$ | Y716(L1) | Y717(L1) | Y718(L1) | Y719(L1) |
| 00 00 05 A0$_{16}$ | Cb0(L0) | Cr0(L0) | Cb2(L0) | Cr2(L0) |
| ⋮ | | ⋮ | | |
| 00 00 08 6F$_{16}$ | Cb716(L0) | Cr716(L0) | Cb718(L0) | Cr718(L0) |
| 00 00 08 70$_{16}$ | Y0(L2) | Y1(L2) | Y2(L2) | Y3(L2) |
| ⋮ | | ⋮ | | |
| 00 07 E8 FC$_{16}$ | Cb716(L478) | Cr716(L478) | Cb718(L478) | Cr718(L478) |

FIG.16

PRINTING SYSTEM FOR CONTROLLING LIMITING A RECEPTION OF COMMAND PACKETS OTHER THAN A TRANSMIT DATA COMMAND UPON RECEIVING THE TRANSMIT DATA COMMAND FOR RECEIVING PRINTING DATA

BACKGROUND OF THE INVENTION

1. Field of the Invention

This invention relates to a printing apparatus to be suitably used for a system for printing images by means of a printer connected thereto by way of an interface conforming to the IEEE (the Institute of Electrical and Electronics Engineers) 1394 Standards.

2. Related Background Art

The IEEE 1394 Standards defines various physical and electric standards for connectors with which various devices are provided for interconnection. It is possible to automatically selected the mode of transmitting and receiving digital data at high speed by automatically connecting devices in the selected mode such as Hot Plug and Play as devices provided with interfaces conforming to the IEEE 1394 standards are physically connected. For such reasons, the IEEE 1394 Standards are currently popularly used as standards for serial interfaces of the industry at large.

In recent years, there have been proposed techniques for using a printer and printing still images received by means of an STB (set top box) or a digital television receiving set by way of a network.

When there is a printing job and it is necessary to cause a printing apparatus designed for such a purpose and an STB for controlling the printing operation of such a printing apparatus to carry out the job, a command packet (JOB_QUEUE) containing a control job command including additional job information (add_job) about the added job is sent to the printing apparatus. Upon receiving the command, the printing apparatus is shifted from initial state (job_exist) M101 to receive wait state (receiving_active) M102 of standing by for receiving the printing data as shown in FIG. 1 of the accompanying drawings.

In the receive wait state M102, the printing apparatus is ready for receiving not only a command packet (CAPTURE) containing a transmit data command including receive request information (receive) but also a command packet (OPERATION_MODE) containing a control printing setup command requiring alternation of the current printing setup.

In the receive wait state M102, the printing apparatus returns to the initial state M101 when it receives a command packet (JOB_QUEUE) containing a control job command including job cancellation information (cancel_job), whereas, it temporarily moves to print wait state M103 and moves further to print state M104 after the elapse of a predetermined period of time when a command packed containing a control job command including job closing information (close_job). As a result, the printing apparatus carriers out the specified printing operation, using the printing data received by means of the transmit data command and also the printing conditions set up by the control printing setup command. When the printing operation is completed or a command packet containing a job control command including job cancellation information, the printing apparatus returns to the initial state M101.

However, with a printing apparatus having such states to take in a manner as described above, if a control printing setup command is input while the apparatus is receiving printing data according to the data transmission command in the receive wait state M102, the conditions set up for printing can be modified to give rise to problems while the apparatus is actually printing.

BRIEF SUMMARY OF THE INVENTION

In view of the above pointed out circumstances, it is therefore the object of the present invention to provide a printing apparatus, a printing control device and a printing system that can stably carry out a printing operation without giving rise to such a problem.

According to the invention, the above object is achieved by providing a printing apparatus comprising:

a printing engine adapted to printing, using printing data;

a data interface for receiving printing data contained in a packet conforming to the IEEE 1394 Standards from outside and outputting a response packet in response to the command packet conforming to the IEEE 1394 Standards received by it from outside; and a controller for controlling the operation mode of said printing engine and/or said data interface;

said controller controlling said data interface so as to make it operate in a command receive mode for receiving a command packet upon receiving an add printing command;

said controller controlling said data interface so as to make it operate in a command limit mode for limiting the reception of command packets other than the one containing said transmit data command upon receiving a transmit data command for receiving printing data.

In another aspect of the invention, there is provided a printing method comprising:

a step of receiving printing data contained in a packet conforming to the IEEE 1394 Standards from outside;

a step of outputting a response packet in response to the command packet conforming to the IEEE 1394 Standards received by it from outside; and a step of controlling the operation mode of the printing control section for controlling the printing operation using printing data and/or the operation mode of the input/output section;

said controlling step being adapted to controlling said input/output section so as to make it operate in a command packet reception mode of receiving command packets upon receiving an add printing command from outside and limiting the reception of command packets other than the one containing said transmit data command upon receiving a transmit data command for receiving printing data.

In still another aspect of the invention, there is provided a printing control device comprising:

an image processor for generating printing data for printing operations;

a data interface for outputting a command for controlling the operation mode of a printing apparatus for carrying out a printing operation by using printing data generated by said image processor, said command being contained in a packet conforming to the IEEE 1394 Standards; and a controller for monitoring the operation mode of said printing apparatus and generating a command to be output to said printing apparatus from said data interface;

said controller controlling said processing apparatus so as to operate in a command receive mode for receiving commands by outputting an add printing command for making said printing apparatus carry out a printing operation from said data interface and in a command limit mode for limiting the reception of command packets other than the one containing said transmit data command by outputting a transmit data command for receiving input data from said data interface.

In still another aspect of the invention, there is provided a printing control method adapted to:

generating a printing data to be used for a printing operation;

outputting a command for controlling the operation mode of a printing apparatus for carrying out a printing operation using said generated printing data, said command being contained in a packet conforming to the IEEE (the Institute of Electrical and Electronics Engineers) 1394 Standards; and controlling said printing apparatus so as to output an add printing command to said printing apparatus in order to making said printing apparatus carry out a printing operation and bring said printing apparatus into a command limiting mode for limiting the reception of command packets other than the one containing a data transmission command by outputting said data transmission command for receiving a printing data to said printing apparatus.

In still in another aspect of the invention, there is provided a printing system comprising:

a printing control device including:

an image processing means for generating printing data to be used for printing;

a first input/output means adapted to outputting a command for controlling the operation mode of the printing apparatus for printing, using the printing data generated by said image processing means, said command being contained in a packet conforming to the IEEE (the Institute of Electrical and Electronics Engineers) 1394 Standards; and a first controller for monitoring the operation of said printing apparatus and generating the command to be output from said input/output means to said printing apparatus; and a printing apparatus including:

a printing means for printing, using the printing data from said printing control device;

a second input means adapted to inputting printing data contained in a packet conforming to the IEEE 1394 Standards and outputting a response packed in response to said command packet conforming to the the IEEE 1394 Standards from said printing control device; and a second controller for controlling the operation mode or said printing means and/or said second input/output means;

said first controller being adapted to controlling said second input/output means so as to make it operate in a command receive mode for outputting an add printing command for making said printing apparatus carry out a printing operation from said first input/output means to said second input/output and receiving a command packet and in a command limit mode for outputting a transmit data command for receiving printing data from said first input/output means to said printing apparatus and limiting the reception of command packets other than the one containing said transmit data command.

As described above, according to the invention, it is now possible to control the operation mode so as to use a command receive mode for receiving a command packet when making the printing apparatus carrying out a printing operation and a command limit mode for limiting the reception of command packets other than the one containing a transmit data command when a transmit data command is input for printing data so that no processing operation for other commands will be conducted while transmitting data and the ongoing printing operation can be carried out on a reliable basis.

BRIEF DESCRIPTION OF THE SEVERAL VIEWS OF THE DRAWING

FIG. 7 is a schematic illustration of the types of still images;

FIG. 8 is a schematic illustration of the configuration of a set up printing command;

FIG. 9 is a schematic illustration of the contents of the operation_mode_parameters contained in the set up printing command;

FIG. 10 is a schematic illustration of the configuration of the data of a capture command;

FIG. 11 is a schematic illustration of a type of images to be stored in image_format_specifier;

FIG. 12 is a schematic illustration of another type of images to be stored in image_format_specifier;

FIG. 13 is a schematic illustration of the operation of transmitting printing data of the image type of 480_422_4×3 on a plane sequential basis;

FIG. 14 is a schematic illustration of the operation of transmitting printing data of the image type of 480_420_4×3 on a plane sequential basis;

FIG. 15 is a schematic illustration of the operation of transmitting printing data of the image type of 480_422_4×3 on a line sequential bases;

FIG. 16 is a schematic illustration of the operation of transmitting printing data of the image type of 480_420_4×3 on a line sequential bases;

DETAILED DESCRIPTION OF THE INVENTION

Now, the present invention will be described by referring to the accompanying drawings that illustrate preferred embodiments of the invention.

Figure 1:
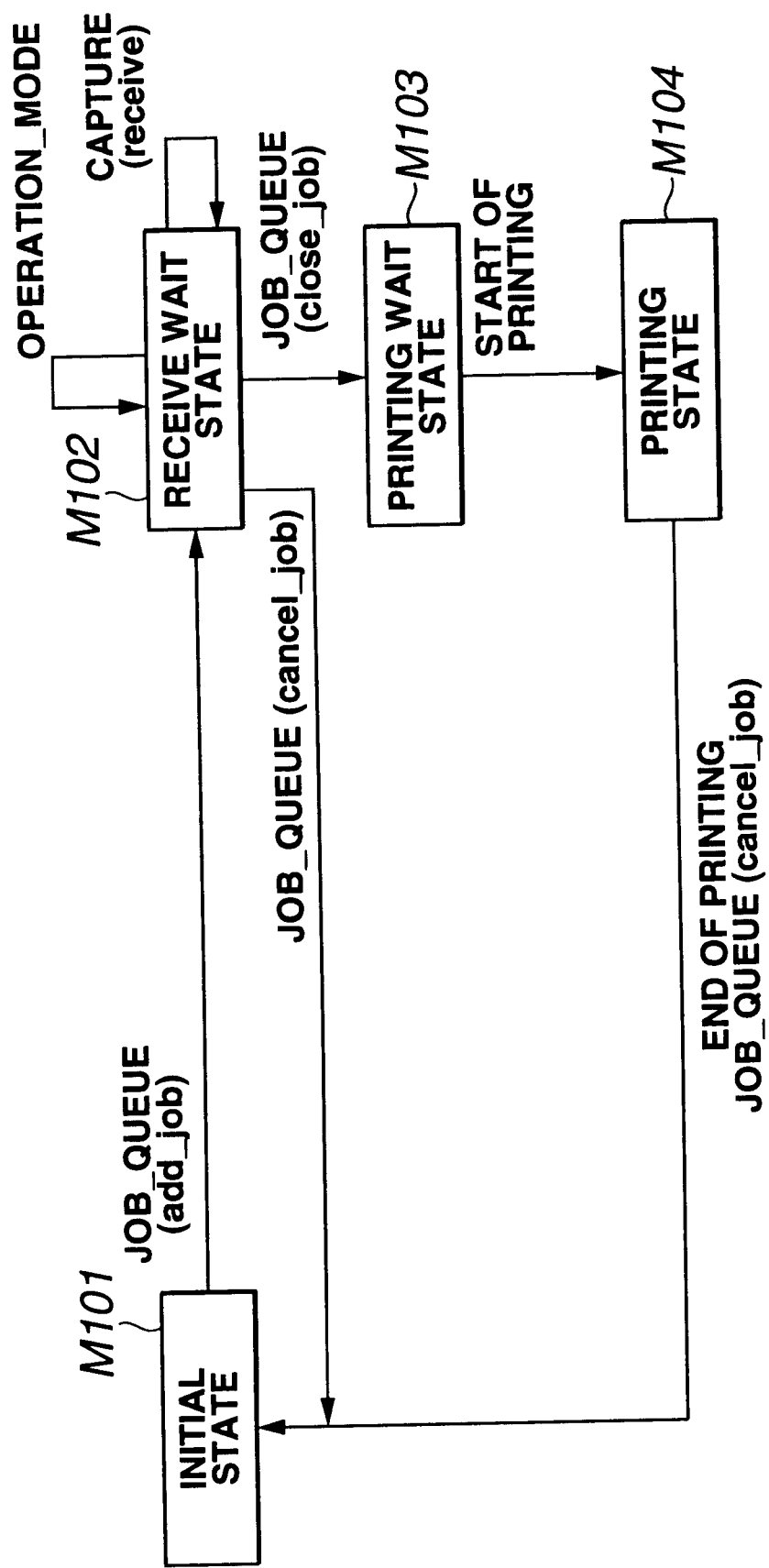
FIG. 1 is a schematic illustration of transition of states of a printing apparatus in a printing operation.
Figure 2:
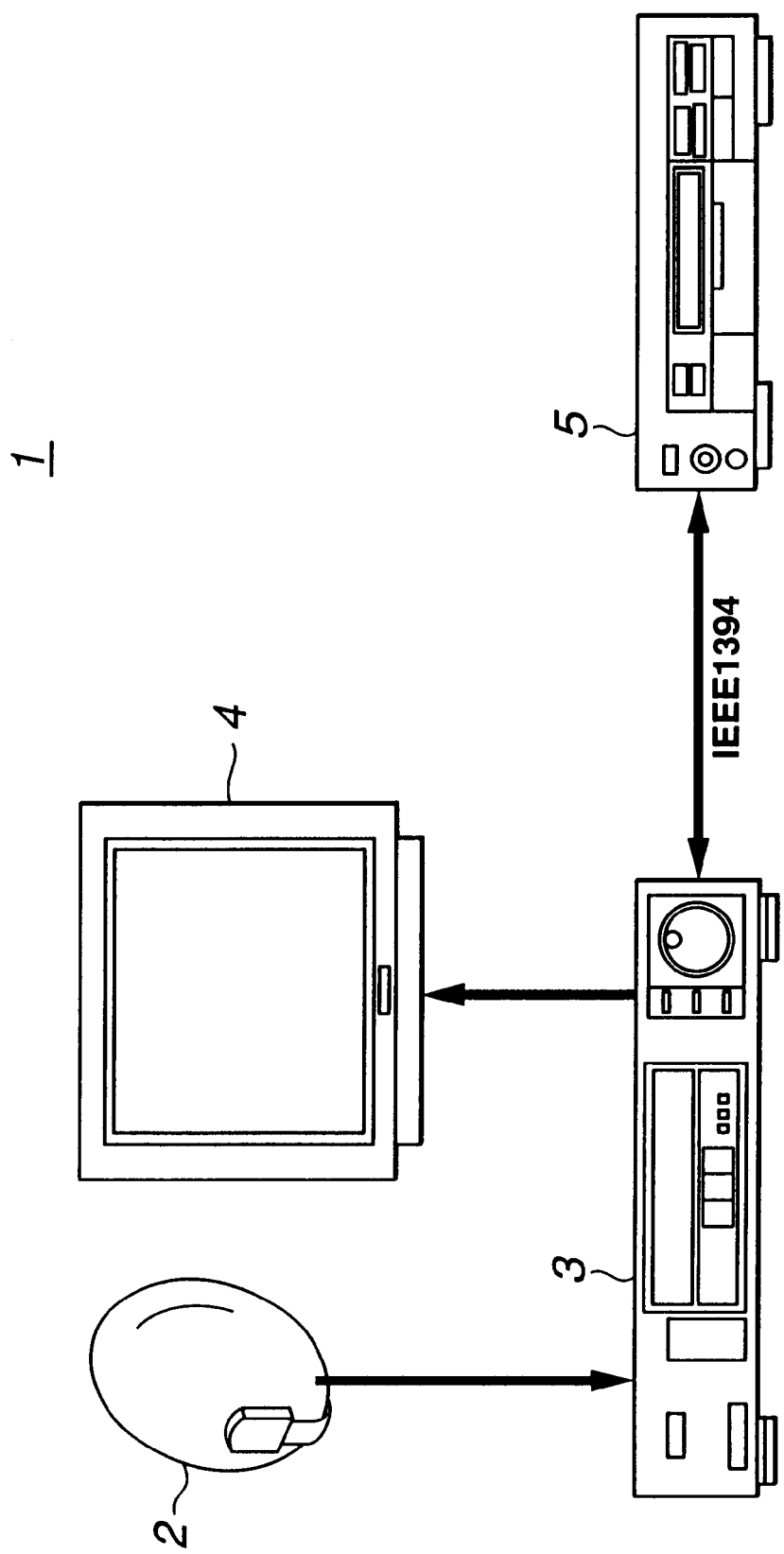
FIG. 2 is a schematic block diagram of an image printing system according to the invention.

FIG. 2 schematically illustrates the configuration of an embodiment of image printing system according to the invention.

The image printing system 1 comprises an antenna 2 for receiving the signal representing the moving picture that is being transmitted typically by way of a broadcasting satellite, an STB (set top box) 3 designed to carry out a predetermined signal processing operation on the received signal representing the data of the moving picture, a television receiving set 4 for displaying a moving picture or that of a still picture and a printing apparatus 5 for printing and output the image received by the antennal.

The antenna 2 receives a video signal representing the moving picture and outputs it to the STB 3. The video signal received by the antenna 2 is multiplexed with other video signals for multi-channel signal transmission and the data of the moving picture is compressed typically by means of the MPEG (Moving Picture Experts Group) system and encoded by a predetermined coding system.

The television receiving set 4 displays the moving picture as the data of a moving picture conforming to the NTSC (National Television System Committee) system by way of STB 3 is input. Note that the television receiving set 4 is also adapted to display a moving picture as the data of a moving picture conforming to the HD (high definition) Standards is input from the STB 3 if it is an HDTV. The television receiving set 4 is also adapted to display a still image or character information that are controlled by the STB 3 for being displayed.

Figure 3:
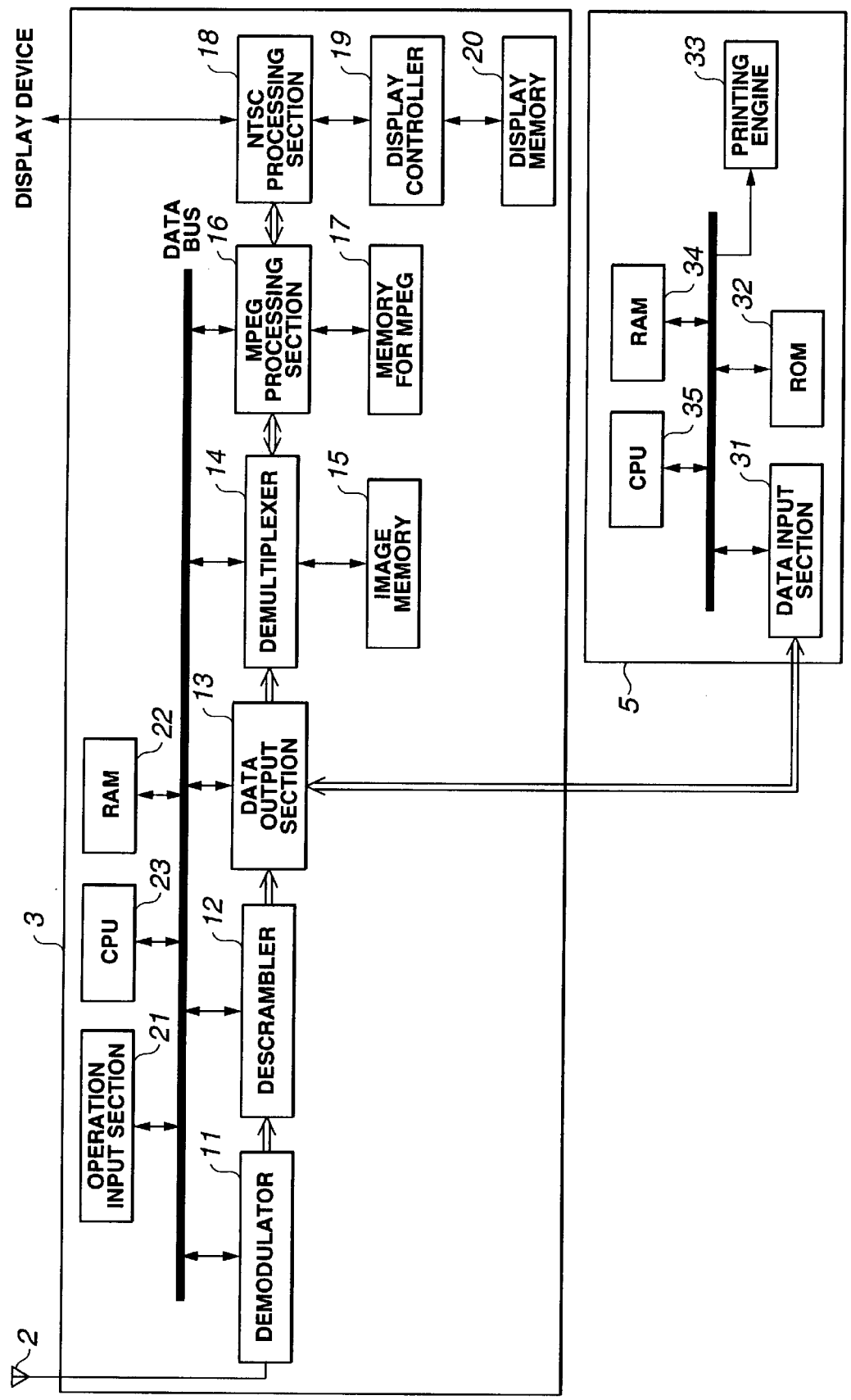
FIG. 3 is a schematic block diagram of the STB and the printing apparatus of an image printing system according to the invention.

Referring to FIG. 3, the STB 3 has a demodulator section 11 for demodulating the video signal received by the antenna 2, a descrambler section 12 for decoding the data of a moving picture, a data output section 13 for carrying out processing operations including that of transforming data conforming to the IEEE 1394 Standards, a demultiplexer section 14 for carrying out processing operations including that of extracting the data of the moving picture of a predetermined channel, an image memory 15, an MPEG processing section 16 for carrying out processing operations including that of decoding signals, a memory for MPEG 17, an NTSC encoder section 18 for transforming data for the purpose of displaying images on display screen of the television receiving set 4, a display control section 19, a display memory 20, an operational input section 21 for receiving commands from the user, a RAM (random access memory) 22 and a CPU (central processing unit) 23 for controlling the operations of the components of the STB 3.

Of the STB 3, the demodulator section 11, the descrambler section 12, the data output section 13, the demultiplexer section 14, the MPEG processing section 16, the operational input section 21, the RAM 22 and the CPU 23 are connected to a bus and the processing operations of the components of the STB 3 are controlled by the CPU 23 by way of the bus.

The demodulator section 11 typically receives an analog video signal showing a moving picture stream from the antenna 2. The demodulator 11 carries out demodulating and A/D (analog to digital) transform operations on the video signal from the antenna 2 and outputs digital data of the moving picture to the descrambler section 12. The demodulator section 11 also receives a control signal from the CPU 23 by way of the bus so that it carries out the demodulating and A/D transform operations under the control of the control signal.

The descrambler section 12 carries out a decoding operation on the data of the moving picture from the demodulator section 11. More specifically, coded data of the moving picture is input to the descrambler section 12, which then carries out a decoding operation according to the decoding system for the input coded data of the moving picture. Then, the descrambler section 12 output the decoded data of the moving picture to the data output section 13. The descrambler section 12 also receives a control signal from the CPU 23 by way of the bus so that it carries out the decoding operation by using the decoding key information contained in the control signal.

The data output section 13 typically comprises an interface circuit conforming to the IEEE 1394 Standards and operates to contain the input data of a moving picture or that of a still picture in a packet according to the IEEE 1394 Standards by carrying out a processing operation on the data of the moving or still picture from the descrambler section 12 according to the IEEE 1394 Standards. More specifically, the data output section 13 generates an isochronous packet when transmitting a temporally continuous data such as that of a moving picture, whereas it generates an asynchronous packet 100 as shown in FIG. 4 when transmitting a static data such as a data of a still image to be printed by the printing apparatus 5 or a data to be used for setting up a command packet or connection.

When the data output section 13 receives an instruction for a printing operation from the CPU 23, it outputs printing job ID information (print_job_ID) for identifying a printing job to be carried out along with the additional printing job information (add_job) about the added printing job to be registered that is also identified by the printing job ID information to the data input section 31. The data output section 13 also outputs a command packet containing job closing information (close_job) indicating the completion of the transmission of the data relating to the printing job to the data input section 31 when the transmission of all the printing data is completed. Additionally, the data output section 13 outputs a command packet containing printing job cancelling information (cancel_job) when operation of data transmission and that of printing to be conducted by the printing apparatus 5 are cancelled.

Still additionally, the data output section 13 controls the operation mode of the printing apparatus 5 by outputting a command packet to the printing apparatus 5 and monitors the operation mode of the printing apparatus 5 by using the processing status information contained in the command packet.

Figures 4, 5:
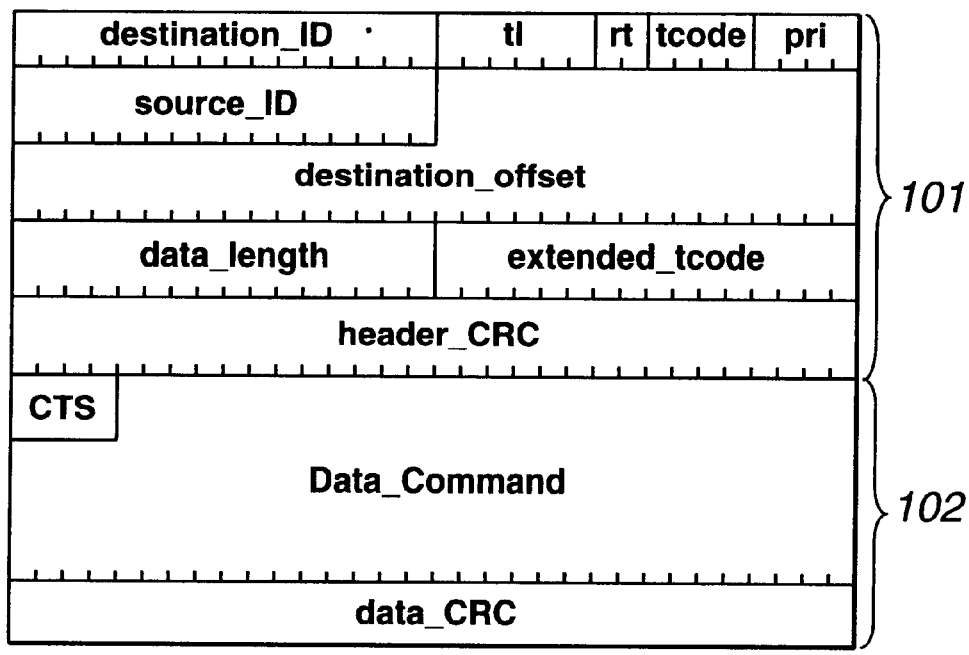
FIG. 4 is a schematic illustration of the configuration of the data of an asynchronous packet to be transmitted form the STB and received by the printing apparatus of FIG. 3.
FIG. 5 is a schematic illustration of the configuration of the data of the data section of an asynchronous packet.

The asynchronous packet 100 shown in FIG. 4 comprises a header section 101 conforming to the IEEE 1394 Standards and a data section 102.

The header section 101 stores the receiver ID (destination_ID) of the packet that is the ID of the printing apparatus 5, the transfer destination label (tl: transaction label), the retransfer code (rt: retry code), the transfer code (tcode: transaction code), the priority (pri: priority), the transmitter ID (source_ID) of the packet that is the ID of the STB, the memory address of the receiver of the packet (destination_offset), the data field length (data_length), the extended transfer code (extended_tcode) and the CRC of the header field (header_CRC) indicating the CRC of the header section 101.

The data section 102 stores the data field storing data conforming to the FCP (function control protocol) and the AV/C protocol and data CRC (data_CRC) indicating the CRC of the header section 102.

As shown in FIG. 5, the data field stores the CTS (command transaction set), the command type (ctype), the subunit type (subunit_type) indicating the type of the subunit of the packet receiver and the subunit ID (subunit_ID) indicating the ID of the subunit of the packet receiver as information conforming to the FCP. The subunit of the packet receiver refers to the data input section 31 of the printing apparatus 5 and the type of the subunit of the packet receiver is expressed by "00010" if it is the printing apparatus 5.

Subsequent to the subunit ID, the data field stores opcode that indicate the type of arithmetic operation and operand [0] through operand [n] that are objects of arithmetic operation along with the printing data (data) to be transmitted to the printing apparatus 5 and the AV/C command to the printing apparatus 5. Note that the command stored in the data field is the one contained in the command set that is referred to as AV/C command for controlling the printing apparatus 5. The CTS as cited above shows the type of the FCP. If its value is 0000 when the packet to be transmitted contains a command, it indicates that the AV/C command defined by the AV/C digital interface command set conforming to the IEEE 1394 Standards is stored in the data field of the data section 102.

When the data output section 13 outputs an isochronous packet to the outside, it transmits it at regular intervals.

Figure 6:
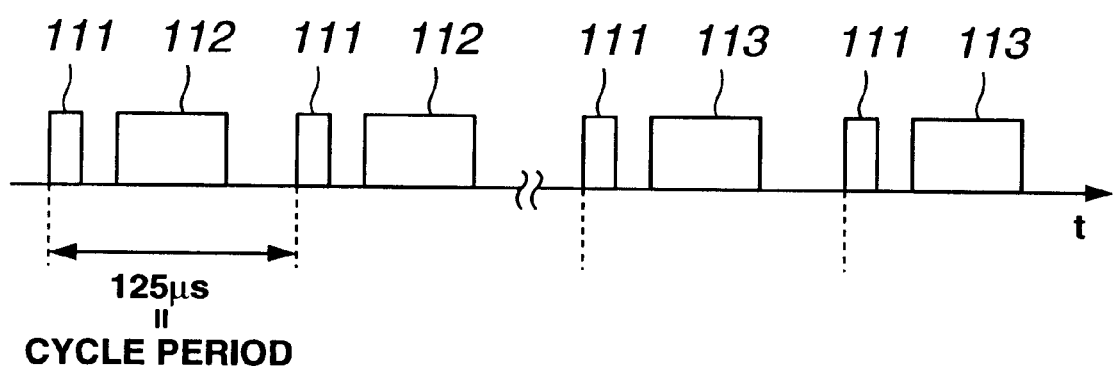
FIG. 6 is a timing chart to be used for transmitting an asynchronous packet from the data transforming section to the data input/output section.

When the data output section 13 transmits an asynchronous packet 100 containing a printing data to be used for the printing operation of the printing apparatus 5, it transmits the asynchronous packet 100 with a cycle period of 125 microseconds as shown in FIG. 6. More specifically, the data output section 13 firstly transmits a cycle start packet 111 that is an asynchronous packet 100 having a header section 101 containing a cycle time data (cycle_time_data) indicating a cycle start (cycle_start) and, after a predetermined temporal gap, a command packet 112 having a data section 102 containing a capture command for typically transmitting a printing data. Thereafter, the data output section 13 transmits a data packet 13 storing a printing data in its data section 102 periodically in each cycle period to the printing apparatus 5 that has received the capture command.

When the data output section 13 outputs a printing data to the printing apparatus 5, it does so by referring to asynchronous arbitration. To be more accurate, each time when the data output section 13 outputs a printing data to the printing apparatus 5, it outputs an asynchronous packet 100 containing the printing data according to the response from the printing apparatus 5.

More specifically, the data output section 13 carries out a processing operation for a transaction layer, a link layer and a physical layer under the control of a serial bus conforming to the IEEE 1394 Standards. As a result, the data output section 13 sets up a connecting relationship with the printing apparatus 5 and generates an asynchronous packet 100 containing a printing data and an overhead that is a piece of control information so that it controls the operation of the printing apparatus 5 on a time division basis by transmitting an asynchronous packet 100 to the printing apparatus 5 to which it is connected according to the IEEE 1394 Standards periodically in each cycle period.

When the data output section 13 displays the data of the moving picture that the STB 3 receives without carrying out any processing operation according to the IEEE 1394 Standard, it outputs the data of the moving picture from the descrambler section 12 to the demultiplexer section 14 according to the control signal from the CPU 23.

The demultiplexer section 14 carries out a channel selecting operation of selecting the channel specified by the CPU 23 out of a plurality of channels, for which the data of the moving picture from the data output section 13 is multiplexed, and outputs only the data of the moving picture of the specified channel to the MPEG processing section 16.

The demultiplexer section 14 stores the printing data in the image memory 15 comprising brightness information and color difference information that is input from the MPEG processing section 16 and outputs it to the data output section 13 under the control of the CPU 23.

The MPEG processing section 16 carries out a decoding operation conforming to the MPEG Standards on the data of the moving picture from the demultiplexer section 14 and outputs the obtained decoded data to the NTSC processing section 18 as uncompressed data of the moving picture. As a result, the MPEG processing section 16 produces an image of the moving picture formed by the image data containing the brightness information (Y) and the color difference information (Cr, Cb) for each frame (to be referred to as YCC image hereinafter). For this operation, the MPEG processing section 16 temporarily stores the data of a plurality of frames of the moving picture to be decoded in the memory for MPEG 17 and utilizes the memory for work areas.

The MPEG processing section 16 generates a YCC image in a pixel format with a sampling frequency ratio of 4:2:2:of the brightness information Y, the color difference information Cr and the color difference information Cb obtained by reducing the color difference information Cr and the color difference information Cb by half either vertically or horizontally relative to the brightness information Y. The MPEG processing section 16 also generates a YCC image in a pixel format with a sampling frequency ratio of 4:2:0 of the brightness information Y, the color difference information Cr and the color difference information Cb obtained by reducing the color difference information Cr and the color difference information Cb both vertically and horizontally relative to the brightness information Y. Note that, while an image of a pixel format with a sampling frequency ratio of 4:2:0 can be formed either by making the odd number lines contain no color difference information Cb or the even number lines contain no color difference information Cr, an image of a pixel format formed by reducing both the color difference information Cr and the color difference information Cb by half either vertically or horizontally is also referred to as one having a sampling frequency ratio of 4:2:0 for the same of convenience. Also note that the MPEG processing section 16 may generate not only a YCC image of a pixel format with a sampling ratio of 4:2:2 or 4:2:0 but also one with a sampling ratio of 4:4:4 produced without reducing any color difference Cr, Cb.

Additionally, the MPEG processing section 16 compresses the data of the moving picture both in the direction of time axis and that of space by carrying out an encoding operation conforming to the MPEG Standards on the data of the moving picture from the NTSC processing section 18 according to the control signal from the CPU 23, showing the compression ratio and other information and outputs the compressed data to the demultiplexer set 14. At this time, the MPEG processing section 16 temporarily stores the data of the moving picture for a plurality of frames to be encoded in the memory for MPEG 17.

The NTSC processing section 18 encodes the data of the moving picture input from the MPEG processing section 16 and transforms it into a data of the moving picture in the NTSC system so that the image may be displayed on the television receiving set 4.

The display control section 19 carries out a processing operation for causing the NTSC processing section 18 to display the image of the data of the moving picture in the NTSC system on the display screen of the television receiving set 4. At this time, the display control section 19 temporarily stores the data to be processed in the display memory 20.

More specifically, the display control section 19 controls the size of the image to be displayed for the moving picture on the television receiving set 4 on a frame by frame basis typically making it to 720 pixels×480 pixels of the NTSC system or vertical 1,920 pixels×horizontal 1,080 pixels of the HD (high definition) system. At this time the display control section 19 generates the data of a pixel to be output to the television receiving set 4, using the information of 16 bits used for the pixel format of the sampling frequency ratio of the brightness signal Y, the color difference signal Cr and the color difference signal Cb of 4:2:2 or the one used for the pixel format of the sampling frequency ratio of the brightness signal Y, the color difference signal Cr and the color difference signal Cb of 4:2:0 as described above.

The display control section 19 may be so arranged that it generates an image of the image type defined in terms of the image size (pixel_x, pixel_y), the scanning system (interlaced/progressive), the pixel format, the screen aspect ratio, the pixel aspect ratio and the data size as shown in FIG. 7 in addition to outputting an image in the above described system to the television receiving set 4. Referring to FIG. 7, an image type where pixel_y is 720 pixels, the pixel type is 4:2:2 and the screen aspect ratio is 16:9 is referred to as 720_422_16×9. Note that the display control section 19 can generates both an image of the image type of 720_422_16×9 that is used in the U.S.A. for the digital TV broadcasting and an image of the image type of 720_420_16×9. Also, the display control section 19 can generates both an image of the image type of 576_422_4×3 that is for PAL (Phase Alternation by line) and an image of the image type of 522_420_4×3.

The operational input section 21 generates an operational input signal and outputs it to the CPU 23 as the user operates the operation buttons of the STB 3. More specifically, as the user operates the buttons, the operational input section 21 generates an operational input signal for suspending the display of the moving picture being displayed on the television receiving set 4 and causing the printing apparatus 5 to be driven for a printing operation.

The CPU 23 typically generates a control signal for controlling the components of the STB 3 on the basis of the operational input signal from the operational input section 21.

When causing the television receiving set 4 to display an image represented by the video signal received by the antenna 2, the CPU 23 outputs a control signal to the demodulator section 11, the descrambler section 12, the data output section 13, the demultiplexer section 14 and the MPEG processing section 16 to cause them to operate respectively for demodulating, decoding, channel selection and carrying out a decoding operation conforming to the MPEG Standards.

When taking in a still image on a frame basis out of the moving picture being displayed on the television receiving set 4 according to the operational input signal from the operation input section 21, the CPU 23 generates a control signal for reading the data of the still image stored in the display memory 20 on a frame basis into the image memory 15 the instant when the operational input signal is input.

Additionally, upon receiving an operational input signal for causing the printing apparatus 5 to print an image for which a still image data is generated, the CPU 23 controls the demultiplexer section 14 and the data output section 13 so as to output the printing data stored in the image memory 15 on a frame basis for a YCC image formed by brightness information Y and color difference information Cr, Cb to the printing apparatus 5 by way of the data output section 13 that is an interface circuit conforming to the IEEE 1394 Standards.

When the data output section 13 transmits the printing data to the printing apparatus 5 under the control of the CPU 23, it transmits a capture command, which will be described hereinafter, to the printing apparatus 5 to make it receive the printing data by transmitting the asynchronous packet 100 storing the capture command subsequent to a subunit ID as shown in FIG. 5.

Now, the printing apparatus 5 will be described.

As shown in FIG. 3, the printing apparatus 5 includes a data input section 31 for receiving a printing data for the printing apparatus 5, a ROM (read only memory) storing a printing control program 32, a printing engine 33, a RAM 34 and a CPU 35 for controlling the components of the printing apparatus 5.

The data input section 31 typically comprises an interface circuit conforming to the IEEE 1394 Standards and adapted to process a signal conforming to the IEEE 1394 Standards for the printing data contained in the asynchronous packet 100 transmitted from the STB 3.

More specifically, the data input section 31 carries out a processing operation for a transaction layer, a link layer and physical layer under the control of a serial bus conforming to the IEEE 1394 Standards. Then, the data input section 31 outputs the printing data contained in the asynchronous packet 100 to the CPU 35.

Additionally, the data input section 31 sets up a connection with the data output section 13 of the STB 3 in order to exchange the asynchronous packet 100 with the printing apparatus 5 when it is mechanically connected with the STB 3 typically by way of an optical cable.

The printing engine 33 comprises a drive mechanism for holding the object of printing, a printing head and a printing head drive mechanism and is adapted to print a still image on the object of printing under the control of the CPU 35.

The CPU 35 generates a control signal for controlling the data input section 31 and the printing engine 33. At this time, the CPU 35 operates according to the printing control program stored in the ROM 32 and controls the contents of the RAM 34, using it for work areas.

Now, the printing setup command to be transmitted from the data output section 13 to the data input section 31 when the STB 3 selects a printing operation to be carried out by the printing apparatus 5 will be described by referring to FIG. 8.

The printing setup command as shown in FIG. 8 contains information in the form of hexadecimal "41" indicating the printing setup command (OPERATION MODE) as opcode (operation code). Subsequently, it will be seen that operand [0] is reserved. The processing status information is stored in operand [1] and the information on the picture number (next_pic) is stored in operand [2], while the information on the page number (next_page) is stored in operand [3] and operand [4] and the information on the printing job ID (print_job_ID) is stored in operand [5] through operand [16]. The information on the operation mode parameters (operation_mode_parameters) is stored in operand [17] through operand [24] and the information on the arbitrarily added operation mode parameters (operation_mode_optional_parameters) is stored in operand [25] through operand [29], while operand [30] through operand [32] are reserved. The data output section 13 controls the processing operation on the printing setup command for the printing apparatus 5 by modifying the contents of the command type (ctype) shown in FIG. 5.

As shown in FIG. 9, the information on the operation mode parameters (operation_mode_parameters) contains the information on the type of printing paper (media_type), the information on the size of printing paper (media_size), the information on the reserved areas (reserved), the information on the printing quality (print_quality), the information on the printing color (mono_color), the information on the printing offset position (offset) and the information on the layout (layout type).

The data output section 13 inquires the printing specifications to which the printing apparatus 5 is adapted by modifying the values stored for the command type and finalizes the setup for the printing apparatus 5.

The data output section 13 receives the information on the operation mode of the subunit (data input section 31, the CPU 35, the printing engine 33) of the printing apparatus 5 as response to its operation of transmitting the printing setup command to the data input section 31. If the data output section 13 transmits the printing setup command to the data input section 31, it receives the information if the printing setup command is received or not and the information on the mode of operation of the printing apparatus 5 as response.

Now, the capture command packet to be generated by the data output section 13 and transmitted to the data input section 31 will be described by referring to FIG. 10.

The capture command packet contains a capture command (CAPTURE) in the form of hexadecimal "42" as opcode (operation code). Subsequent to it, the packet contains the information on the subfunction at operand [0].

Operand [1] stores the information on the subunit type of the transmitting side (source_subunit_type) in the upper order 5 bits and the information on the subunit ID of the transmitting side (source_subunit_ID) in the lower order 3 bits and operand [2] stores the information on the plug of the transmitting side (source_plug), while operand [3] stores the information on the processing status (status) and operand [4] stores the information on the plug of the receiving side (dest_plug). Then, in the capture command, the information on the printing job ID (print_job_ID) is stored in operand [5] through operand [16] and the information on the data size (data size) is stored in operand [17] through operand [20], while the information on the image size (image_size_x) is stored in operand [21] and operand [22], while the information on the image size (image_size_y) is also stored in operand [23] and operand [24] and the information on the image format (image_format_specifier) is stored in operand [25] and operand [26]. Operand [27] through operand [29] are reserved and the information on the picture number to be processed (next_pic) is stored in operand [30], while the information on the page number to be processed (next_page) is stored in operand [31] and operand [32]. In this image printing system 1, a "job" as used herein refers to the entire processing operation from data transmission to printing and includes at least a page. A "page" as used herein refers to a unit of a printing medium (e.g., printing paper) to be processed in a job and contains at least a picture. A "picture" as used herein refers to a unit to be processed that is obtained by dividing each page so that it is contained in a page and may be a specific picture.

The information on the subunit type of the transmitting side (source_subunit_type) refers to the information indicating the type of the subunit to be used for transmitting the asynchronous packet 100 from the STB 3 side and the information on the subunit ID of the transmitting side (source_subunit_ID) refers to the information indicating the ID of the subunit to be used for transmitting the asynchronous packet 100. The information on the plug of the transmitting side (source_plug) refers to the plug number of the subunit to be used for transmitting the asynchronous packe 100 and the information on the plug of the receiving side (dest_plug) refers to the plug number of the subunit to be used for receiving the asynchronous packet 100. The information on the printing job ID (print_job_ID) refers to the ID of the job of printing a still image and the information on the data size (data size) refers to the amount of data to be transmitted from the STB 3 to the printing apparatus 5 for printing a still image by means of the printing apparatus 5, while the information on the image size (image_size_x) refers to the number of pixels in the x-direction corresponding to the image type shown in FIG. 7 and the information on the image size (image_size_y) refers to the number of pixels in the y-direction corresponding to the image type. The information on the image format (image_format_specifier) refers to the name of the image type. The reserved operands may comprise any arbitrarily selected number of bits and are provided to make the number of bits of the capture command equal to a multiple of four. By providing the reserved operands, the packet transmitted by the STB 3 and received by the printing apparatus 5 is made to have an appropriate number of bits to be used as a data unit when transmitting a packet conforming to the IEEE 1394 Standards.

As shown in FIG. 11, in the information on the image format (image_format specifier), the image type is identified by a hexadecimal value (Value). In FIG. 11, the expression "plane" in the denomination of image type signifies that the image is a still image transmitted on a plane sequential basis from the data output section 13 to the printing apparatus 5, whereas the expression "line" in the denomination of image type signifies that the image is a still image transmitted on a line sequential basis from the data output section 13 to the printing apparatus 5.

Note that the information on the image format may be used not only to describe the denomination of the image type as shown in FIG. 11 but also store the denomination of the image type that is expressed by a hexadecimal value (Value, Sub-value) as shown in FIG. 12 and does not contain any information on the number of pixels unlike the one shown in FIG. 11. Then, the number of pixels to be used for the printing operation of the printing apparatus 5 is defined by the image_size_x described in operands [21] and [22] and the image_size_y described in operands [23] and [24] of the capture command of FIG. 10.

For instance, if the image type is described by a hexadecimal number "00" in msb of the information on the image format (image_format_specifier), it signifies that the image data is transmitted to the printing apparatus 5 as RGB data. Additionally, when a hexadecimal number "00" is described in msb of image format specifier, the RGB data is transmitted in the order of R, G, B, R, G, B, . . . if a hexadecimal number "00" is described in lsb, whereas the RGB data is transmitted in the order of R, G, B, 0, R, G, B, 0 . . . if a hexadecimal number "01" is described in lsb. In other words, if "00" in msb, R, G, B, 0 are transmitted as a unit of 4-byte data by sending 0 data between B and R.

If, on the other hand, a hexadecimal number "01" (meaning: YCC raw) is described in the msb of the information on the image format (image_format_specifier), it signifies that the image data is transmitted to the printing apparatus 5 as YCC data. Additionally, when a hexadecimal number "01" is written in msb of image_format_specifier, the brightness information and the color difference information are transmitted in the pixel format of 4:2:2 on a pixel sequential basis (pixel) if a hexadecimal number "0X (X being an indefinite numeral)" (Type: YCC 4:2:2 raw/pixel) is written in lsb and the data in the 4:2:2 is transmitted on a line sequential basis if a hexadecimal number "1X" (Type YCC 4:2:2 raw/line) is written in lsb, whereas the data in the pixel format of 4:2:2 is transmitted on a pixel sequential basis if a hexadecimal number "8X" (Type: YCC 4:2:2 raw/pixel) is written in lsb and the data in the pixel format 4:2:0 is transmitted on a line sequential basis if a hexadecimal number "9X" (Type: YCC 4:2:0 raw/line) is written in lsb.

Still additionally, when a hexadecimal number "01" (meaning: YCC raw) is written in msb of the information on the image format (image_format_specifier), a data is transmitted with a pixel ratio (pixel ratio 1.00×1.00, pixel ratio 1.19×1.00 or pixel rtio 0.89×1.00), a color space (ITU-R (International Telecommunications Union-Radiocommunication Sector) BT.709-2, ITU-R BT.601-4 or ITU-R BT.1203) and pixel sequential or line sequential are specified for data transmission if hexadecimal numbers "X0 through XC" are described in lsb, whereas an interlaced image is transmitted if hexadecimal numbers "X0 through X4" are written in lsb and a progressive image is trasmitted if hexadecimal numbers "X8 through XC" are written in lsb. Furthermore, a data conforming to ITU-R BT.709-2 is transmitted if hexadecimal numbers "X0 through X2" and "X8 through XA" are written in lsb and a data conforming to ITU-R BT.601-4 is transmitted if hexadecimal numbers "X3" and "XB" are written in lsb, whereas a data conforming to ITU-R BT.1203 (PAL system) is transmitted if hexadecimal numbers "X4" and "XC" are written in lsb.

Still additionally, when a hexadecimal number "10" (meaning: DCF Object) is written in msb of the information on the image format (image_format_specifier), the image data is transmitted to the printing apparatus 5 in the format defined by the digital camera (DCF: Design rule for Camera Format). Furthermore, when a hexadecimal number "10" is written in msb of the information on the image format (image format specifier), the data in the Exif format where a header recording the imaging conditions in the JPEG format is added to the image section is transmitted if a hexadecimal number "00" (Type: Exif 2.1) is written in lsb and the data in the JFIF format is transmitted to the printing apparatus 5 if a hexadecimal number "01" (Type: JFIF (JPEG File Interplay Format)) is written in lsb, whereas the data in the TIFF format is transmitted if a hexadecimal number "02" (Type: TIFF(Tag Image File Format)) written in lsb and the data in the JPEG format is transmitted if a hexadecimal number "0F" (type: JPEG (Joint Photographic Coding Experts Group)) is written in lsb.

Still furthermore, when a hexadecimal numbers "80 through 8F" are written in msb of the information on the image format (image_format_specifier), they indicate that the data is transmitted in some other format and the data is transmitted in the format as specified by "00 through FF" that are written in lsb.

Still furthermore, it is also possible to set "00" (Type: Unit Plug defined) signifying that lsb is dependent on the plug of the STB 3 and that of the printing apparatus 5 or "01" (don't care) signifying that it is not necessary to specify any data format in the information on the image format (image_format_specifier) if a hexadecimal number "FE" (Meaning: Special meaning) is written in msb.

In response to the transmission of the capture command to the data input section 31, the information on the operation mode of the subunit (the data input section 31, the CPU 35, the printing engine 33) of the printing apparatus 5 is sent to the data output section 13. When the data output section 13 transmits the capture command to the data input section 31, information indicating if the capture command is received or not and also the operation mode of the printing apparatus 5 is sent back to the data output section 13 as information on the processing status.

Now, the operation of transmitting an image data from the data output section 13 to the data input section 31 according to the capture command will be described by way of an example.

After transmitting an asynchronous packet containing the capture command and receiving ACK (acknowledge) from the printing apparatus 5, the data output section 13 transmits an asynchronous packet 100 containing the printing data to the printing apparatus 5.

At this time, assume that the data output section 13 transmits the asynchronous packet 100 containing an image data that shows that the image type is 480_422_4×3, has pixels with pixel numbers 0 through 719 in the x-direction and line numbers 0 through 479 in the y-direction and indicates that a still image is printed on a plane sequential basis (plane) to the printing apparatus 5 as shown in FIG. 11. Then, it actually transmits the printing data in the order as illustrated in FIG. 13.

More specifically, the data output section 13 transmits the brightness information Y0 (L0), the brightness information Y1 (L0), the color difference information Cb0 (L0) and the color difference information Cr0 (L0) for the pixel number 0 that is contained in the line number 0 subsequent to the address offset (address_offset). Subsequent to the image data for the pixel numbers down to 719 contained in the line number 0, the data output section 13 transmits the brightness information and the color difference information for the line numbers from 1 and also the image data for the pixel numbers down to 719 contained in the line number 479 to complete the transmission of the printing data for a still image.

Now, assume that the data output section 13 transmits the asynchronous packet 100 containing an image data that shows that the image type is 480_420_4×3. Then, as shown in FIG. 14, it transmits the brightness information Y0 (L0), the brightness information Y1 (L0), the brightness information Y0 (L1) and the brightness information Y1 (L1) for the pixel number 0 contained in the line number 0 subsequent to the address offset (address_offset) and then the color difference information Cb0 (L0) and the color difference information Cr0 (L0), the brightness information Y2 (L0) and the brightness information Y3 (L0) contained in the pixel data of the pixel number 0. Thereafter, the data output section 13 completes the transmission of the printing data for a still image by transmitting the pixel data down to the pixel number 719 contained in the line number 479.

Furthermore, assume that the data output section 13 transmits the asynchronous packet 100 containing an image data that shows that the image type is 480_422_4×3 on a line sequential basis. Then, as shown in FIG. 15, it transmits the brightness information Y0 (L0), the brightness information Y1 (L0), the brightness information Y2 (L0), the brightness information Y3 (L0), . . . the brightness information Y719 (L0) for the line number 0 subsequent to the address offset (address_offset) subsequent to the address offset (address_offset) and then the color difference information Cb0 (L0), the color difference information Cr0 (L0), . . . , the color difference information Cb718 (L0) and the color difference information Cr718 (L0) for the line number 0. Thereafter, it transmits the brightness information and the color difference information for the line numbers from 1. The data output section 13 completes the transmission of the printing data for a still image when it transmits the color difference information Cr718 (L479) for the line number 479.

Finally, assume that the data output section 13 transmits the asynchronous packet 100 containing a printing data that shows that the image type is 480_420_4×3 on a line sequential basis. Then, as shown in FIG. 16, it transmits the brightness information Y0 (L0) through the brightness information Y719 (L0) for the line number 0 and then the brightness information Y0 (L1) through the brightness information Y719 (L1) for the line number 1. Subsequently, it transmits the color difference information Cb0 (L0) and the color difference information Cr0 (L0) through the color difference information Cb718 (L0 and the color difference information Cr718 (L0) for the line number 0 and then it transmits the pixel data for the line number 0 and the line number 1. Then, it transmits the brightness information and the color difference for the lines from line number 2 and completes the transmission of the printing data when it transmits the color difference information Cb718 (L478) and the color difference Cr718 (L478).

Now, the processing operation of the printing apparatus 5 according to the printing control program will be described by referring to the flow chart of FIG. 17.

Figure 17:
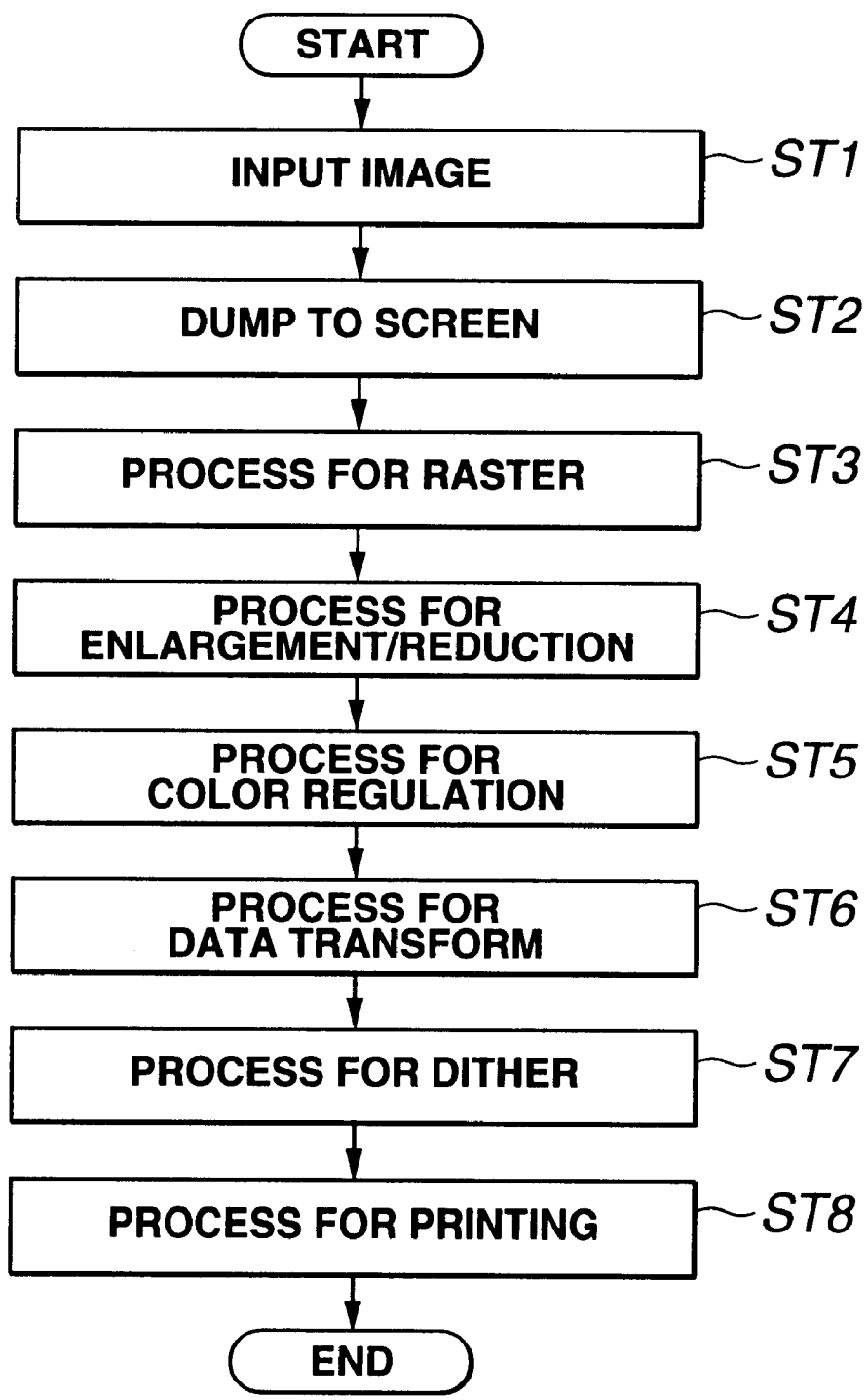
FIG. 17 is a flow chart of the processing operation of printing by means of the printing apparatus of an image printing system according to the invention.

Referring to FIG. 17, firstly, in Step ST1, the data input section 31 of the printing apparatus 5 receives the packet generated according to the IEEE 1394 Standards from the data output section 13. At this time, the data input section 31 extracts the printing data for a YCC image formed on the basis of brightness information Y and color difference Cr, Cb by carrying out a processing operation for a physical layer, a link layer and a transaction layer conformting to the IEEE 1394 Standards.

Then, in Step ST2, the CPU 35 carries out a processing operation of screen dump for printing all the image displayed on the display screen of the television receiving set 4.

In subsequent Step ST3, the CPU carries out a processing operation of raster on the image data that is processed for screen dump in Step ST2. In other words, the CPU 35 transforms the printing data into that of a dot format so that it may be transferred to the printing engine 33.

Then, in Step ST4, the CPU 35 carries out a processing operation of enlargement/reduction on the image data that is processed for raster in Step ST3. In other words, the CPU 35 carriers out a processing operation for changing the size of the still image within the range specified by the user to be used when printing the image.

Thereafter, in Step ST5, the CPU 35 produces a printing data for R (red), G (green) and B (blue) out of the printing data containing the brightness information and the color difference information by carrying out a processing operation for regulating the colors of the printing data that is processed for enlargement/reductio in Step ST4.

Then, in Step ST6, the CPU 35 carries out a processing operation for transforming the printing data for RGB that is regulated for colors in Step ST5 into a printing data for cyan, magenta and yellow and determining the mixture ratio of cyan, magenta and yellow of each processing dot. Then, in Step ST7, the CPU 35 carriers out a processing operation for dither.

Thereafter, in Step ST8, the CPU 35 outputs the printing data obtained by processing for dither to the printing engine 33 to drive the latter and print the image on the object of printing.

Now, the operation of the CPU 23 when printing the image of the image data received by the STB 3 by using the printing apparatus 5 of the image printing system 1 having the above described configuration will be described by referring to FIG. 18.

Figure 18:
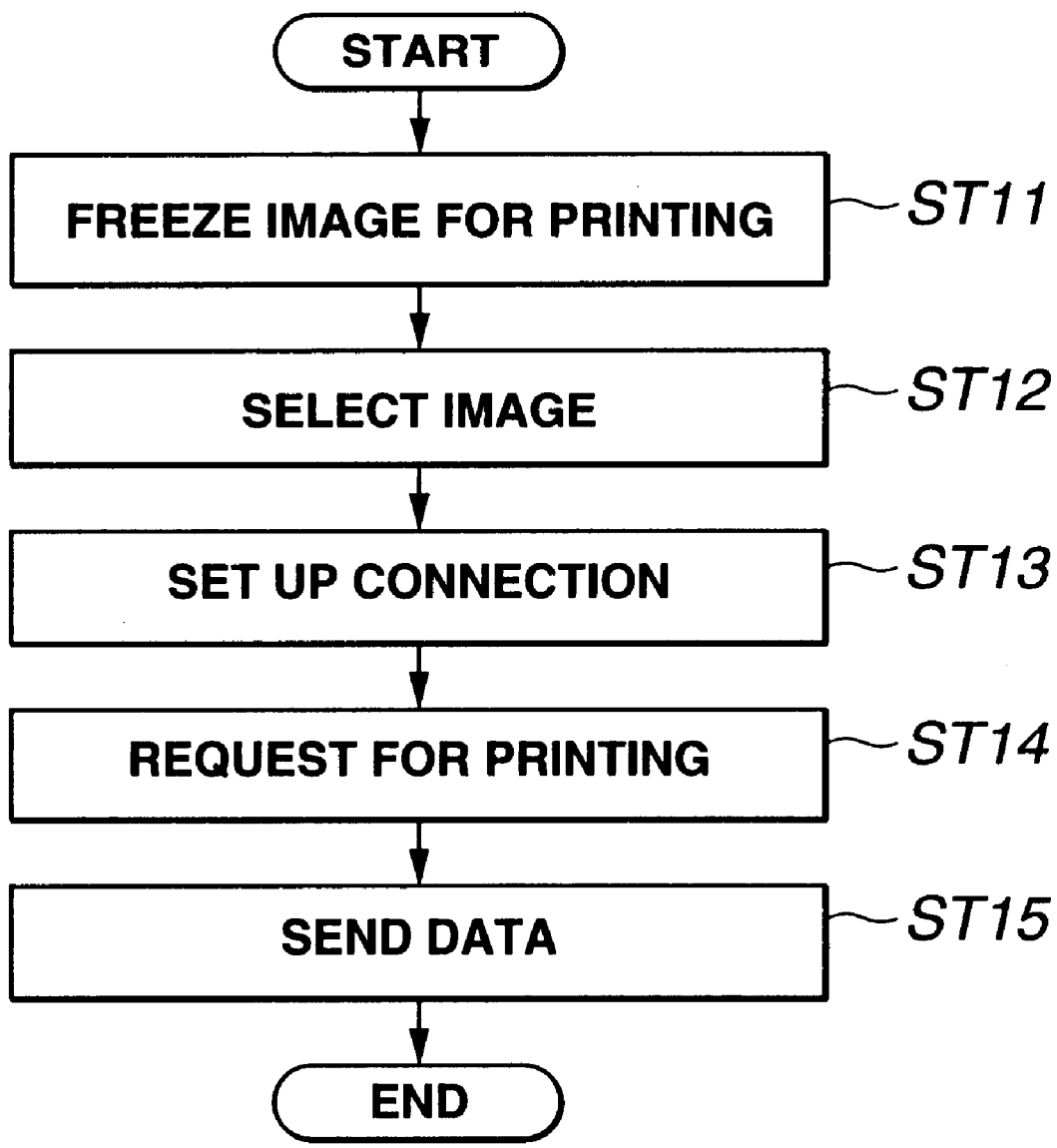
FIG. 18 is a schematic illustration of the processing operation of the CPU of the STB when printing an image displayed on a television receiving set by means of a printing apparatus.

Referring to the flow chart of FIG. 18, firstly in Step ST11, the CPU 23 of the STB 3 receives an operational input signal for freezing the moving picture that is being displayed on the television receiving set 4 as the user operates an appropriate operation buttons with which the STB 3 is provided. In response to the reception of the signal, the CPU 23 causes the television receiving set 4 to display the selected still image by controlling the display control section 19 so as to suspend the output of the moving picture data from the NTSC processing section 18 to the television receiving set 4.

Then, if an operational input signal for selecting the still image that is freezed in Step ST11 and being displayed on the television receiving set 4 and printing it on a frame basis by means of the printing apparatus 4 is received from the operational input section 21 in Step ST12, the CPU 35 controls the display control section 19, the MPEG processing section 16 and the demultiplexer section 14 so as to cause them to read the still image data stored in the display memory 20 into the image memory 15 on a frame basis. As a result, the CPU 23 stores the printing data containing the brightness information Y and the color difference information Cr, Cb in the image memory 15.

Then, in Step ST13, the CPU 35 controls the data output section 13 so as to set up a connection between the STB 3 and the printing apparatus 5 according to the IEEE 1394 Standards. More specifically, upon receiving the control signal for setting up a connection from the CPU 23, the data output section 13 generates a command packet and carries out an operation of recognizing the its plug and the plug of the data input section 31. At this time, the data output section 13 transmits the command packet containing the information indicating that the data input section 31 of the printing apparatus 5 stores the information on the plug of the transmitting side. Then, the data input section 31 of the printing apparatus 5 recognizes the information indicating the plug of the transmitting side and transmits the command packet storing the information indicating the plug of the receiving side for asynchronously connecting it. As a result, the data output section 13 recognizes the information indicating the plug of the receiving side of the data input section 31 of the printing apparatus 5 while the data input section 31 recognizes the information indicating the plug of the transmitting side of the data output section 13 of the STB 3.

Then, in Step ST14, the CPU 23 requests printing setup parameters including those for the printing size, the printing direction and the printing position to be used for the printing operation of the printing apparatus 5 using the printing data. At this time, the CPU 23 causes the data output section 13 to output a printing setup command and determines the printing setup conditions of the printing apparatus 5 according to the response to the printing setup command.

Then, in Step ST15, the CPU 23 controls the demultiplexer section 14 and the data output section 13 so as to cause them to output the printing data to be used for the printing operation of the printing apparatus 5. More specifically, the CPU 23 controls the data output section 13 so as to cause it to output the capture command for transmitting data from the data output section 13 to the data input section 31, generate a data packet containing the printing data stored in the image memory 15 and transmit the generated data packet to the printing apparatus 5.

Then, after receiving a plurality of data packets containing the information indicating the plug of the receiving side, the printing apparatus 5 determines that all the printing data is received by it. Then, the CPU 35 carries out the processing operation as shown in FIG. 17 to print the image of the image data that meets the specified conditions including the specified printing size.

Figure 19:
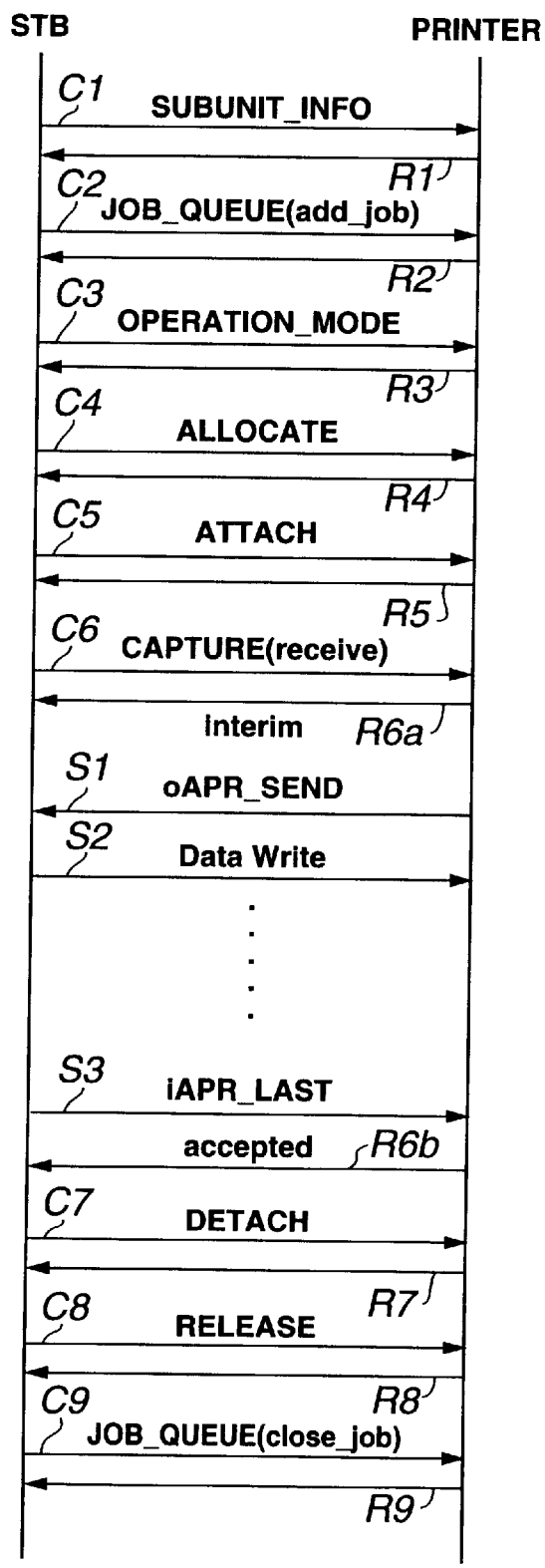
FIG. 19 is a flow chart of the processing operation of transmitting data of an image printing system according to the invention.

Now, the operation of exchanging an asynchronous packet between the STB 3 and the printing apparatus 5 and that of the printing apparatus 5 of printing an image according to the printing data it receives by way of an example as shown in FIG. 19.

Referring to FIG. 19, firstly the STB 3 transmits command packet C1 containing a command (SUBMIT_INFO) requesting the information on the status of the subunit of the printing apparatus 5 to the printing apparatus 5 and receives response packet R1 for the request. As a result, it recognizes the data input section 31 and the printing engine 33.

Then, before starting the data transmitting operation, the STB 3 transmits command packet C2 (JOB_QUEUE) containing a job control command for adding a job to the printing apparatus 5 to show that there is a job of printing a still image and receives response packet R2 for the transmitted command packet.

Then, the STB 3 transmits command packet C3 containing a printing setup command (OPERATION_MODE) indicating the type of printing paper to be used, the size of the sheet of printing paper, the printing quality, the colors to be used for printing the image (black & white/color), the printing position and so on to the printing apparatus 5 and receives response packet R3 for the transmitted command packet.

Thereafter, the STB 3 selects the plug to be used for transmitting the printing data to the printing apparatus 5. More specifically, the STB 3 firstly transmit command packet C4 containing a plug allocation command (ALLOCATE) to the printing apparatus 5 in order to select the plug of the receiving side and receives response packet R4 for the transmitted command packet.

Then, the STB 3 transmits command packet C5 containing a plug connection command (ATTACH) indicating that a data packet is to be transmitted and received by selecting the plug for receiving the data packet containing the printing data to be used for the printing operation of the printing apparatus 5 and receives response packet R5 for the transmitted command packet.

Thereafter, the STB 3 transmits command packet C6 containing a capture command (CAPTURE) requesting the printing apparatus 5 to receive the printing data. Then, the printing apparatus 5 may transmits response packet R6a (interim) indicating that it cannot immediately send back the response, to the STB 3.

Then, the printing apparatus 5 transmits packet S1 containing the information for selecting oAPR (output Asynchronous Port Register) that is the port to be used when the STB 3 transmits the printing data on an asynchronous basis to the STB 3.

Then, the STB 3 transmits data packet S2 containing the printing data to the printing apparatus 5 over a plurality of times.

When the operation of transmitting all the printing data is over, the STB 3 transmits command packet S3 containing the information for iAPR (input Asynchronous Port Register) of the flow control register of the plug of the transmitting side to the printing apparatus 5.

Then, the printing apparatus 5 transmits response packet R6b to the STB 3, indicating that the command packet C6 containing the capture command is accepted.

In response to this, the STB 3 transmits command packet C7 containing a connection release command (DETACH) for releasing the connection with the printing apparatus 5 and receives response packet R7 from the printing apparatus 5.

Thereafter, the STB 3 transmits command packet C8 containing a release packet(RELEASE) to the printing apparatus 5 and receives response packet R8 from the printing apparatus 5.

Then, the STB 3 transmits command packet C9 (JOB_QUEUE) containing a job control command indicating that the sequence indicating the job of printing a still image is over to the printing apparatus 5 and receives response packet R9 for the transmitted command packet.

Now, the transition of operation mode of the printing apparatus 5 when the above processing operation is carried out will be described by referring to FIG. 20.

Figure 20:
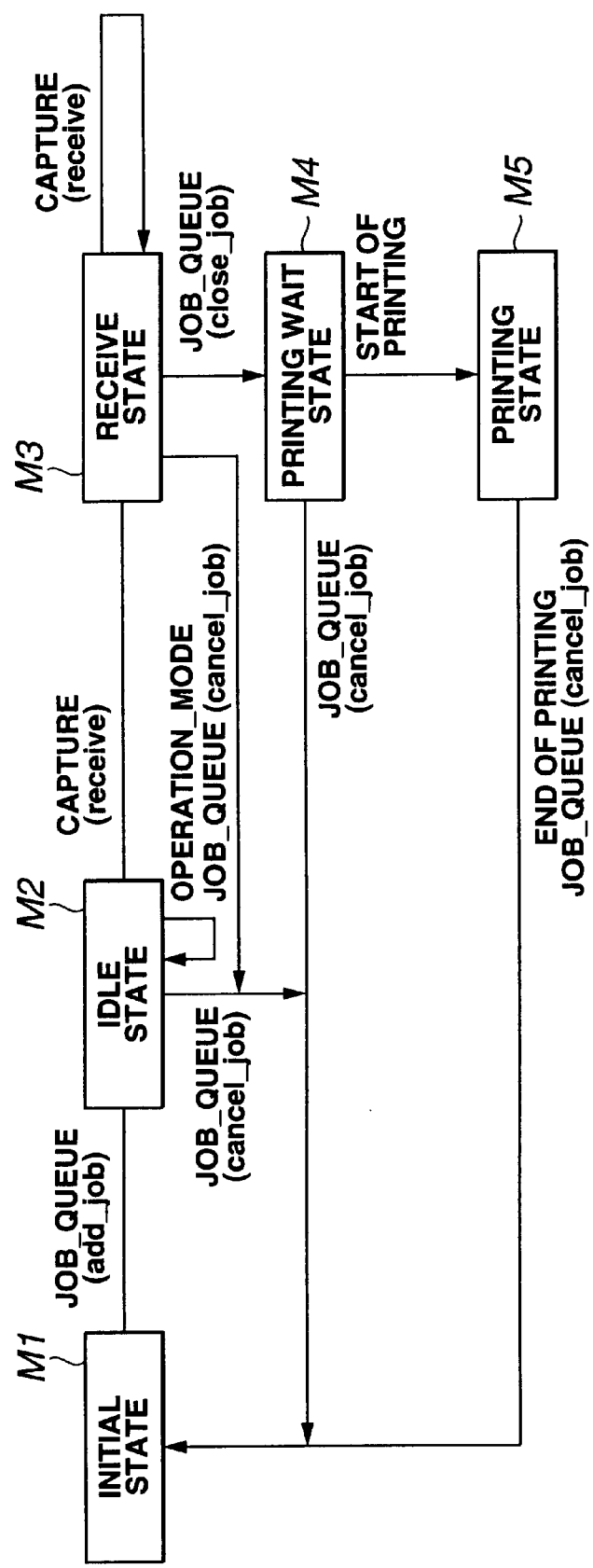
FIG. 20 is a schematic illustration of transition of states of the printing apparatus of an image printing system according to the invention in a printing operation of the printing apparatus.

Firstly, the printing apparatus 5 is in initial status M1 as shown in FIG. 20 when no printing job control command is input to it. In other words, the data input section 31 and the CPU 35 of the printing apparatus 5 are not operating. Referring to FIG. 19, at the time when the command packet C1 is transmitted from the data output section 13 to the data input section 31, the printing apparatus 5 is in the initial status M1.

As the command packet C2 containing a job control command (add_job) for adding a job is input to the data input section 31, it is moved into idle status M2 where it is ready for receiving the various command packets containing the printing setup command (OPERATION_MODE), the capture command (CAPTURE) and so on. If a printing setup command is input in the idle status M2, the CPU 35 causes the printing engine 33 to carry out a processing operation of modifying the printing setup and returns to the idle status M2. If, on the other hand, a command packet containing printing job cancelling information (cancel job) is input in the idle status M2, the printing apparatus 5 returns to the initial status M1. As the command packet C6 containing a capture command is input, the printing apparatus 5 is moved into reception status M3 for receiving a printing data from the STB 3.

In the reception status M3, the data input section 31 receives the printing data sequentially output from the STB 3 if a value indicating data reception is stored as subfunction information. In the reception status M3, an operation mode adapted to receive only a capture command is set in the data input section 31 so as to limit the reception of any other commands such as a printing setup command. In other words, if a printing setup command is input in the reception status M3, the data input section 31 sends a response packet containing processing status information to the data output section 13, telling the latter that it cannot receive any printing setup command because it is in the reception status M3.

The printing apparatus 5 returns to the initial status M1 if a command packet containing printing job cancelling information (cancel_job) is input in the reception status M3. Then, as a command packet containing a printing job control command containing job closing information (close_job) is input, the printing apparatus 5 moves into printing standy status M4 where it waits for a printing operation for a predetermined period of time.

The data input section 31 of the printing apparatus 5 returns to the initial status M1 if a command packet containing printing job cancelling information (cancel_job) is input in the printing standby status M4. In the printing standby status M4, the CPU 35 controls the printing engine 33 so as to start a printing operation after the elapse of a predetermined period of time and moves it into printing status M5.

In the printing status M5, the printing engine 33 returns to the initial status M1 when the printing operation according to the printing data received in the reception status M3 is over. Additionally, in the printing status M5, the printing apparatus 5 returns to the initial status when printing job cancelling information (cancel_job) is input from the STB 3 to the data input section 31.

With an image printing system 1 adapted to carry out the above described processing operations, it is possible to set the data output section 13 in an operation mode where it is ready for receiving various commands including a printing setup command in the idle status M2 and in an operation mode where it receives only a capture command and limits the operation of processing any other command packets such as one containing a printing setup command in the reception status M3. Therefore, with such an image printing system 1, the processing operations in the reception status M3 can be held away from becoming complex and hence the printing apparatus 5 can carry out printing operations on a stable basis. In other words, with such an image printing system 1, the printing setup (e.g., the type of printing data) will never be modified while a printing setup command is transmitted and a printing data is received in the reception status M3.

Figure 21:
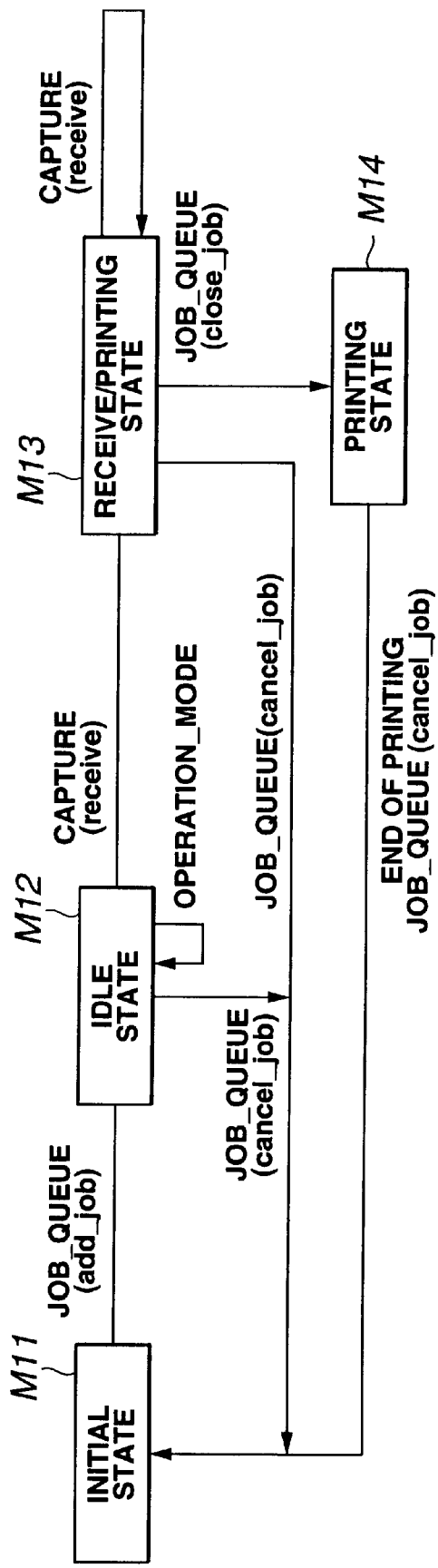
FIG. 21 is another schematic illustration of transition of states of the printing apparatus of an image printing system according to the invention in a printing operation of the printing apparatus.

The transition of operation mode of the printing apparatus 5 will be described further by way of another example as shown in FIG. 21.

Firstly, the printing apparatus 5 is in initial status M11 as shown in FIG. 20 when command packet C1 is input to it.

Then, as command packet C2 containing a job control command (add_job) for adding a job is input to the data input section 31, it is moved into idle status M12. If a printing setup command is input in the idle status M12, the CPU 35 modifies the printing setup for the printing operation of the printing engine 33 and then the printing apparatus 5 returns to the idle status M12. If, on the other hand, a command packet containing printing job cancelling information is input in the idle status M12, the printing apparatus 5 returns to the initial status M11. Then, as a command packet containing a capture command is input, the data input section 31 is moved into reception/printing status M13 where it is ready for receiving printing data from the STB 3.

In the reception/printing status M13, the printing data sequentially output from the STB 3 is received by the data input section 31 and the printing engine 33 is driven to operate for a printing operation, using the printing data received by the data input section 31, if a value indicating data reception (receive) is stored as subfunction information. In the reception/printing status M13, an operation mode adapted to receive only a capture command is set in the data input section 31 so as to limit the reception of any other commands such as a printing setup command. In other words, if a printing setup command is input in the reception/printing status M13, the data input section 31 sends a response packet containing processing status information (status) to the data output section 13, telling the latter that it cannot receive any printing setup command because it is in the reception/printing status M13.

The data input section 31 of the printing apparatus 5 returns to the initial status M11 if a command packet containing printing job cancelling information (cancel_job) is input in the reception/printing status M13. In the recpetion/printing status M13, the printing engine 33 returns to the printing status M14 where it stands by for a printing operation when a command packet containing a job control command showing job closing information (close_job) is input.

In the printing status M14, the printing apparatus 5 returns again to the initial status when the printing operation according to the printing data is received in the reception/printing status M11 and not processed for printing is over. Additionally, in the reception/printing status M13, the printing apparatus 5 returns to the initial status M11 when printing job cancelling information (cancel_job) is input from the STB 3 to the data input section 31.

With an image printing system 1 adapted to carry out the above described processing operations, it is possible to set the data output section 13 in an operation mode where it is ready for receiving various commands including a printing setup command in the idle status M12 and in an operation mode where it receives only a capture command and limits the operation of processing any other command packets such as one containing a printing setup command in the reception/printing status M13. Therefore, with such an image printing system 1, the processing operations in the reception/printing status M13 can be held away from becoming complex and hence the printing apparatus 5 can carry out printing operations on a stable basis. In other words, with such an image printing system 1, the printing setup (e.g., the type of printing data) will never be modified while a printing setup command is transmitted and a printing data is received in the reception/printing status M13.

While the STB 3 and the printing apparatus 5 are provided respectively with a data transform section 13 and a data input section 31 that are interface circuits conforming to the IEEE 1394 Standards in the above description of the image printing system 1, they may be replaced by some other interface circuits such as USBs. Then, with an image printing system 1 comprising an STB 3 and a printing apparatus 5 provided with USBs, it is possible for the STB 3 and the printing apparatus 5 to exchange packets in a digital format in order to make the printing apparatus 5 print finely defined images.

What is claimed is:

1. A printing apparatus comprising:

a printing engine adapted to printing, using printing data;

a data interface for receiving printing data contained in a packet conforming to the IEEE 1394 Standards from outside and outputting a response packet in response to the command packet conforming to the IEEE 1394 Standards received by it from outside; and a controller for controlling the operation mode of said printing engine and/or said data interface;

said controller controlling said data interface so as to make it operate in a command receive mode for receiving a command packet upon receiving an add printing command;

said controller controlling said data interface so as to make it operate in a command limit mode for limiting the reception of command packets other than the one containing said transmit data command upon receiving a transmit data command for receiving printing data.

2. The printing apparatus according to claim 1, wherein said controller is adapted to control said data interface so as to limit the reception of a printing setup command for controlling the contents of the printing setup of said printing engine when the operation mode of said data interface is moved to a command limiting mode.

3. The printing apparatus according to claim 1, wherein said controller is adapted to control said printing engine so as to set said data interface into a command limiting mode and said a printing engine into a printing mode for carrying out a printing operation when a data transmission command is input.

4. A printing method comprising:

a step of receiving printing data contained in a packet conforming to the IEEE 1394 Standards from outside;

a step of outputting a response packet in response to the command packet conforming to the IEEE 1394 Standards received by it from outside; and a step of controlling the operation mode of the printing control section for controlling the printing operation using printing data and/or the operation mode of the input/output section;

said controlling step being adapted to controlling said input/output section so as to make it operate in a command packet reception mode of receiving command packets upon receiving an add printing command from outside and limiting the reception of command packets other than the one containing said transmit data command upon receiving a transmit data command for receiving printing data.

5. The printing method according to claim 4, wherein said input/output section is so controlled as to be limit the reception of printing setup commands for controlling the contents of the printing setup in said controlling step when the when the operation mode of said input/output section is moved to a command limiting mode.

6. The printing method according to claim 4, wherein said input/output section is so controlled as to be moved into a command limiting mode and into a printing mode for carrying out a printing operation when a data transmission command is input.

7. A printing control device comprising:

an image processor for generating printing data for printing operations;

a data interface for outputting a command for controlling the operation mode of a printing apparatus for carrying out a printing operation by using printing data generated by said image processor, said command being contained in a packet conforming to the IEEE 1394 Standards; and a controller for monitoring the operation mode of said printing apparatus and generating a command to be output to said printing apparatus from said data interface;

said controller controlling said processing apparatus so as to operate in a command receive mode for receiving commands by outputting an add printing command for making said printing apparatus carry out a printing operation from said data interface and in a command limit mode for limiting the reception of command packets other than the one containing said transmit data command by outputting a transmit data command for receiving input data from said data interface.

8. The printing control device according to claim 7, wherein said controller controls said printing apparatus so as to limit the reception of a printing setup command for controlling the contents of the printing setup of said printing apparatus when the operation mode of said printing apparatus is moved to a command limiting mode.

9. The printing control device according to claim 7, wherein said printing apparatus is so controlled as to be moved into a command limiting mode and into a printing mode for carrying out a printing operation using a printing data when a data transmission command is output.

10. The printing control device according to claim 7, wherein said printing data is generated on the basis of a television signal and utilized for a television signal receiving apparatus.

11. A printing control method adapted to:

generating a printing data to be used for a printing operation;

outputting a command for controlling the operation mode of a printing apparatus for carrying out a printing operation using said generated printing data, said command being contained in a packet conforming to the IEEE (the Institute of Electrical and Electronics Engineers) 1394 Standards; and controlling said printing apparatus so as to output an add printing command to said printing apparatus in order to making said printing apparatus carry out a printing operation and bring said printing apparatus into a command limiting mode for limiting the reception of command packets other than the one containing a data transmission command by outputting said data transmission command for receiving a printing data to said printing apparatus.

12. The printing control method according to claim 11, wherein said printing apparatus so controlled as to limit the reception of a printing setup command for controlling the contents of the printing setup of said printing apparatus when the operation mode of said printing apparatus is moved to a command limiting mode.

13. The printing control device according to claim 11, wherein said printing apparatus is so controlled as to be moved into a command limiting mode and into a printing mode for carrying out a printing operation using a printing data when a data transmission command is output.

14. A printing system comprising:

a printing control device including:

an image processing means for generating printing data to be used for printing;

a first input/output means adapted to outputting a command for controlling the operation mode of the printing apparatus for printing, using the printing data generated by said image processing means, said command being contained in a packet conforming to the IEEE (the Institute of Electrical and Electronics Engineers) 1394 Standards; and a first controller for monitoring the operation of said printing apparatus and generating the command to be output from said input/output means to said printing apparatus; and a printing apparatus including:

a printing means for printing, using the printing data from said printing control device;

a second input means adapted to inputting printing data contained in a packet conforming to the IEEE 1394 Standards and outputting a response packed in response to said command packet conforming to the the IEEE 1394 Standards from said printing control device; and a second controller for controlling the operation mode or said printing means and/or said second input/output means;

said first controller being adapted to controlling said second input/output means so as to make it operate in a command receive mode for outputting an add printing command for making said printing apparatus carry out a printing operation from said first input/output means to said second input/output and receiving a command packet and in a command limit mode for outputting a transmit data command for receiving printing data from said first input/output means to said printing apparatus and limiting the reception of command packets other than the one containing said transmit data command.

* * * * *